July 3, 1973 TAKEWO CHIKU ET AL 3,743,543
SEPARATOR FOR CONTROLLING ALKALI METAL ION FLOW
IN AN ELECTRODE ACTIVE MATERIAL OR ELECTROLYTE
Filed Sept. 29, 1970 2 Sheets-Sheet 1

INVENTORS.
TAKEWO CHIKU
OSAMI KAMIGAITO,
AKIO ISOGAI,
BY

ATTORNEYS

United States Patent Office 3,743,543
Patented July 3, 1973

3,743,543
SEPARATOR FOR CONTROLLING ALKALI METAL ION FLOW IN AN ELECTRODE ACTIVE MATERIAL OR ELECTROLYTE
Takewo Chiku, Toyota, and Osami Kamigaito and Akio Isogai, Nagoya, Japan, assignors to Kabushiki Kaisha Toyota Chuo Kenkyusho, Showa-ku, Nagoya-shi, Aichi-ken, Japan
Filed Sept. 29, 1970, Ser. No. 76,506
Claims priority, application Japan, Oct. 3, 1969, 44/79,447
Int. Cl. H01m 3/04; C22d 3/02
U.S. Cl. 136—6 FS                    13 Claims

ABSTRACT OF THE DISCLOSURE

A separator for use as the membrane separating electrode active materials in a sodium-sulfur cell, or electrolyte in a sodium hydroxide electrolyzer for producing sodium, and comprising a partition made of alpha-alumina which is alkali resistant and electrically insulating, an opening formed in said partition and extending from side to side thereof, and a member made of beta-alumina crystal rotatably journaled in said opening, whereby the flow of alkali metal ions from one side of the partition to the other through said rotatable member is controlled by turning said member to change is conductivity.

FIELD OF THE INVENTION

This invention relates to a separator for controlling alkali metal ion flow in an electrode active material or in an electrolyte, and more particularly to a partition formed of alkali resistant and electrically insulating material incorporating a rotatable shaft formed of beta-alumina crystal. The rotatable shaft has the property of great conductive anisotropy. Therefore, when the separator is used in a sodium-sulfur battery cell to separate two electrodes (electricity collectors) and the sodium and sulfur liquid electrode active materials, or the separator is used in a sodium hydroxide electrolyzer for producing sodium, the number of alkali metal ions passing through the rotatable shaft per unit of time can be changed by rotating the shaft, due to its large conductive anisotropy.

SUMMARY OF THE INVENTION

The separator according to the invention comprises a partition formed of alpha-alumina and having an opening therein which extends from side to side and in which is journaled a shaft formed of beta-alumina crystal. As used throughout this specification and claims, beta-alumina is defined as a crystalline material having layers of $Al_2O_3$ connected by Al—O bonds, wherein sodium or potassium atoms reside between the layers. One selected perpendicular to said layers is called the C-axis. A selected plane perpendicular to the C-axis is called the C-plane, and the direction of said C-plane is the C-plane direction. Because of the layer structure of beta-alumina crystal, the conductivity of alkali metal ions is high in the C-plane direction, in other words, within or parallel to the C-plane, but very poor in the direction of the C-axis, that is, perpendicularly through said layers. Accordingly, when the separator of the invention, incorporating a shaft formed of beta-alumina crystal is utilized and the shaft is rotated, the passage of alkali metal ions through the shaft from one side of the separator to the other is very high in the C-plane direction and very low in the direction of the C-axis. This is used to control the flow of alkali metal ions when the separator is placed in an electrolytic cell.

From the above, it will be apparent that the primary object of the invention is to provide a separator so constructed as to permit control of the flow of alkali metal ions from one side of the separator to the other by rotational manipulation of a beta-alumina crystal shaft incorporated in the separator.

Another object of the invention is to provide a separator, having the above described characteristics, which is useful when incorporated in a sodium-sulfur battery cell to control the alkali metal in flow in said cell and thereby control the current generated by the cell.

Still another object of the invention is to provide a separator, having the above described characteristics, which is useful for the control of alkali metal ion flow in a sodium-hydroxide electrolyzer for producing sodium.

BRIEF DESCRIPTION OF THE DRAWINGS

The novel features which are considered characteristic of the invention are set forth with particularity in the appended claims. The invention, itself, however, both as to its organization and its method of operation, together with additional objects and advantages thereof, will best be understood from the following specific embodiments when read in connection with the accompanying drawings, wherein like reference characters indicate like parts throughout the several figures, and in which:

DESCRIPTION OF PREFERRED EMBODIMENTS

Figure 1:
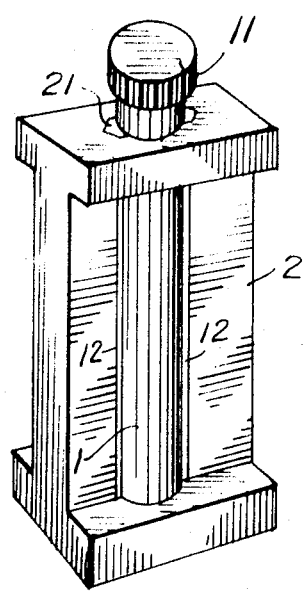
FIG. 1 is a perspective view of a separator for control of alkali metal ion flow in an electrode active material or in an electrolyte.
Figure 3:
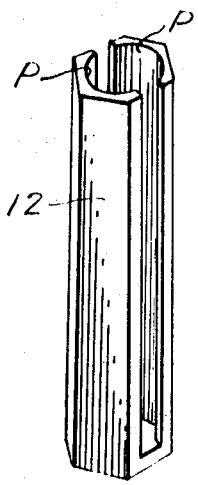
FIG. 3 is a perspective view of a sealing member forming a part of the separator shown in FIG. 1.
Figure 2:
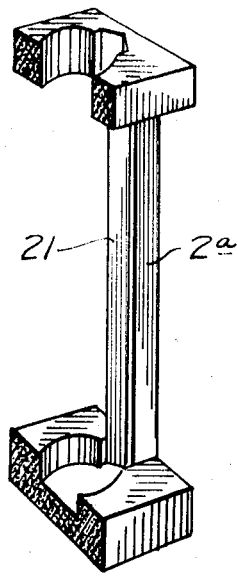
FIG. 2 is a perspective view of one-half of the separator of FIG. 1 when cut along its central vertical plane and excluding the rotatable shaft and sealing member.

Referring now more particularly to a first embodiment illustrated in FIGS. 1-3, a separator according to the invention is illustrated as comprising the partition 2 having the vertical opening 21 in which is seated a seal member 12 which journals a rotatable shaft 1 formed of beta-alumina crystal. Mounted on the top of shaft 1 is a knob, or gear 11, for manual or mechanical rotation of the shaft.

A detailed description of the mode of making the separator and its operation follows.

Partition 2, FIG. 1, is I-shaped in vertical section having a thin central wall terminating in upper and lower, thicker horizontal flanges. The partition 2 is made of alkali resistant material which is electrically insulating, such as sintered alpha-alumina which may be formed by a conventional sintering method. For example, alpha-alumina powder is compressed into the shape of the partition and heated at about 1500 to 1600° C.

Alternatively, it is possible to cut a block of alpha-alumina sintered product into the desired shape by using a diamond cutter. The opening 21 for journaling the shaft 1 is cut through the upper flange of partition 2 and vertically through substantially the entire center wall. Since the center wall is thinner than the diameter of the shaft 1, the shaft is exposed on both sides of the center wall. As it is very difficult to cut the hole 21, it may be preferable to form the partition 2 in complementary halves divided on a central vertical plane through the axis of the opening 21 and then to adhere the two halves together by fusing with Kovar glass. One half 2a, of the partition 2, is illustrated in FIG. 2.

The shaft 1 is formed of a single beta-alumina crystal. First, the C-plane of the crystal is found by conventional X-ray defraction, and then the shaft is cut out of the crystal using a diamond cutter and holding the axis of the shaft within, or parallel to the C-plane of the crystal. The shaft is then polished carefully to the desired shape and size.

Instead of forming the shaft 1 from a single large expensive crystal, it is also possible to form the shaft from a block composed of many small crystals, or from slices or chips of single crystals. When small crystals are used, it is first necessary to determine the C-axis of each small crystal, this being done by X-ray defraction. The small crystals are dusted with Kovar glass powder and oriented with their C-planes parallel to form a large block when fused with Kovar glass. The crystal shaft is then formed from said block by the same method mentioned above. Alternatively, a single crystal may be spalled to form chips and expose a plane of cleavage, the cleavage plane being in the C-plane of the crystal. The slices or chips of the crystal are stacked and adhered by fusion with Kovar glass, keeping the same C-axis direction, to make a large block. Again, the shaft is formed from said block by the method mentioned above.

In both the preceding examples the small crystals, or crystal slices are laid on each other and heated to about 1000° C. to fuse with the Kovar glass. Kovar glass is alkali resistant and a stable material against alkali metal ions. Further, the glass does not damage the beta-alumina crystal shafts.

The beta-alumina crystal shaft 1 having conductive anistropy can also be produced by the method described in the U.S. Pat. No. 3,655,845. Namely, sodium or potassium is diffused into a thin plate of alpha-alumina in an atmosphere containing sodium or potassium. Sodium oxide or potassium oxide penetrates into the plate and forms mainly beta-alumina crystals as layers perpendicular to the direction of the thickness of the plate. Thus, a beta-alumina plate is produced having its C-axis in the direction of the thickness of the plate. A plurality of such plates are adhered by fusion with Kovar glass to make a block from which the shaft 1 can be formed in the manner described above.

Since both the shaft 1 and the partition 2 are formed of ceramics, it is very difficult to move, or slide one against the other. Therefore, the seal member 12 is used both to ease such movement and to seal the opening 21, so as to prevent an electrode active material or electrolyte from passing from one side of the partition to the other through spaces about the shaft 1. As illustrated in FIG. 3, seal member 12 is formed in tubular shape open at the top and closed at the bottom. Preferably, the seal is made from an elastic material such as alkaline resistant plastic, or rubber. Two diametrically opposed slots are formed in the wall of the tube from the top to substantially the bottom wall of the tube, and these slots, when the tube is inserted in the opening 21 in the partition 2, are substantially aligned with the opposite exterior surfaces of the center wall of the partition. The inner, cylindrical surface P of the seal member 12 slidably contacts the exterior surface of the cylindrical shaft 1, and the outer surface of the seal 12 contacts the inner surface of the partition 2, i.e., the wall of the opening 21. The seal member may be seated in the opening 21, or may be fixed to the wall of the partition in any suitable manner. The curvature of the surface P is made slightly smaller than the diameter of the shaft 1 to more securely seal the shaft 1 by reason of the elasticity of the seal material.

In assembling the separator, when the same is formed of two complementary halves, part 2A of alpha-alumina sintered material is joined to its complementary part by fusing with Kovar glass to provide the complete partition 2. Then, seal member 12, FIG. 3, is put into the opening 21 of partition 2, and the crystal shaft 1 is seated in the seal member to complete the separator.

The gear 11, preferably made of phenolic resin, is adhered coaxially on top of shaft 1. The shaft may then be revolved about its own axis by manually turning the gear 11, or by turning the same through a mechanical arrangement connected to gear 11. As the axis of the shaft 1 is in the C-plane of the beta-alumina single crystal, and when the partition is disposed in an electrolytic cell to form two compartments therein housing alkaline liquid electrode active material, the surface areas of the shaft exposed to electrode active material on both sides of the partition 2 are equal, and the two exposed areas include an equal amount of area of C-plane edges and non-C-plane edges, or areas containing planes perpendicular to the C-plane. The ratio of the area of the C-plane edges with respect to the area of the non-C-plane edges exposed to electrode active material on each side of the partition changes in accordance with the rotation of the shaft 1. When the C-plane of the shaft 1 is perpendicular to the partition 2, that is, when the C-axis of the shaft crystal is parallel to the partition, alkali metal ions flow easily from one side of the partition to the other side through shaft 1. When the shaft 1 is revolved 90° from its previous position and the C-plane of the shaft crystal is parallel to the partition 2, very few alkali metal ions flow through the shaft. Thus, by rotating the shaft, control of the alkali metal ion flow from one side of the partition to the other can be easily accomplished.

From the above, it will be apparent that the amount of alkali metal ion current passed through the beta-alumina crystal shaft in a given time depends on the alkali metal ion conductivity of the shaft in the direction from one side of the partition to the other, which depends upon the orientation of the shaft. The shaft has such great alkali metal ion conductive anisotropy that the amount of alkali metal ion flow can be varied continuously and in inverse proportion to the total area of the C-plane surfaces exposed at the sides of the partition 2.

The inventors have tested and determined the alkali metal ion conductivity of a single crystal of beta-alumina in the direction of the C-axis and in the direction of the C-plane by applying an electron beam to the crystal in a vacuum. These tests confirmed that the conductivity of a beta-alumina single crystal in the C-plane is 5 to 100 times higher than the conductivity in the direction of the C-axis, which is perpendicular to the C-plane. Also, a poly-beta-alumina crystal (formed of many small crystals) oriented in the direction of the C-axis was found to show similar great conductivity anisotropy. A beta-alumina crystal formed of microcrystals and in which 50% by weight of the microcrystals were disposed within 20° of the solid angle of the C-axis direction (the amount of crystals whose C-axis directions were within the stated solid angle) showed that the conductivity of the poly-crystal in the C-plane is more than 5 times the conductivity of the poly-crystal in the C-axis direction. This confirmed the possibility of using a shaft formed of many small crystals, or single crystal slices, or chips.

Figure 4:
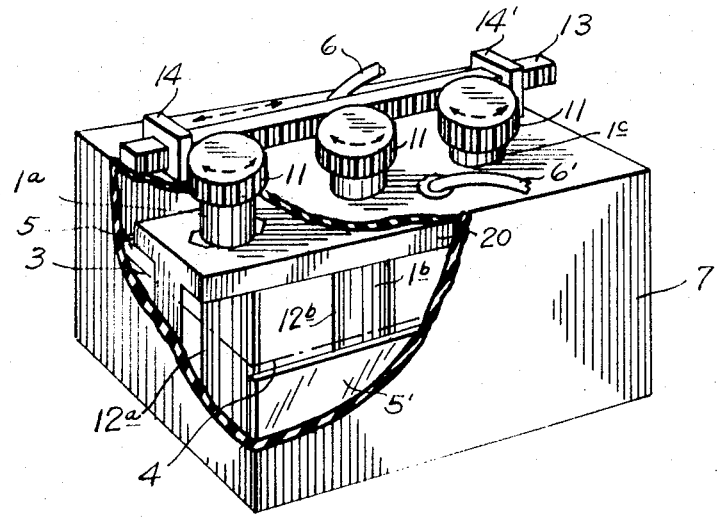
FIG. 4 is a perspective view of a sodium-sulfur battery cell incorporating a separator according to the invention and partly broken away to reveal internal details.

FIG. 4 illustrates the utilization of a separator in accordance with the invention in a sodium-sulfur cell. Such a cell comprises molten sodium, molten sulfur, an alkaline metal ion conductive separator between the sodium electrode active material and the sulfur electrode active material, an anode immersed in the sulfur, and a cathode immersed in the sodium. Sodium ions pass through the separator and react with the sulfur and produce electric current in the cell which is led away by lead-in wires connected to the cathode and anode.

The sodium-sulfur cell shown in FIG. 4 comprises a vessel 7 within which is placed a separator 20 dividing the vessel into two compartments. One compartment houses molten sodium, to a level 3, and cathode 5. The other compartment houses molten sulfur, to the level 4, and anode 5'. The lead-in wires 6 and 6' are respectively connected to the electrodes 5, 5'.

Separator 20 is, in all respects, similar to the separator 2, FIG. 1, and is made and functions in the same way, except that separator 20 is longer to occupy the complete length internally of the vessel 7, and three alkali metal ion controller shafts 1a, 1b and 1c are provided in the separator instead of the single controller shaft 1 of FIG. 3. The body of separator 20 is formed of alpha-alumina and has the same I-shaped, vertical cross-section as separator 1. The three seal members 12a, 12b and 12c are seated in the vertical openings of the separator to seal and journal the shafts 1a, 1b and 1c which are formed of beta-alumina crystal, as described for shaft 1 of FIG. 1. Each shaft 1a, 1b and 1c is provided at its upper end with a gear 11 and all three shafts may be rotated simultaneously by rack 13 whose teeth mesh with the teeth of gears 11. The rack 13 slides longitudinally in aligned openings in the guides 14, 14'. Thus, by moving the rack 13 forwardly or backwardly in the guides, either by hand, or by mechanical means, the shafts 1a, 1b and 1c can be turned to a desired angle in the same direction and at the same time.

Figures 5A, 5B, 5C:
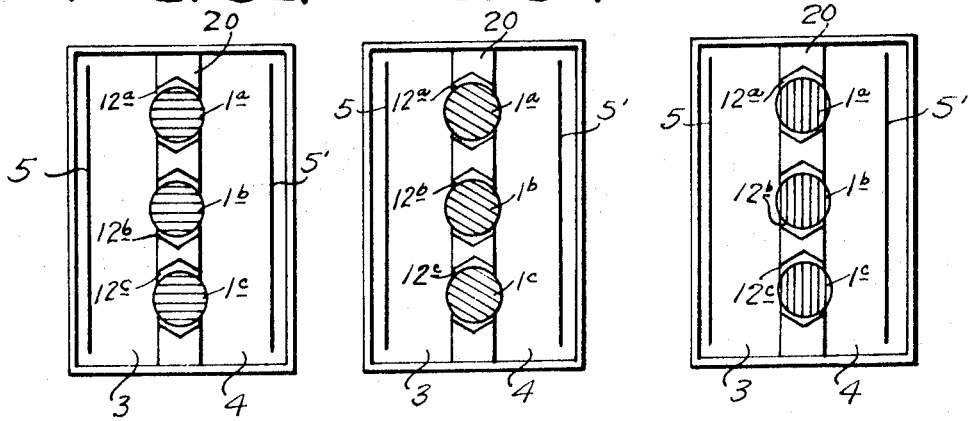
FIGS. 5A, 5B and 5C are schematic views taken on a horizontal plane through the cell of FIG. 4 and showing the shafts of the separator rotated to different control positions.

Operation of the separator in the sodium-sulfur cell can be more readily understood by reference to the diagrams of FIGS. 5A, 5B and 5C. In these diagrams the parallel lines in the shafts 1a, 1b, and 1c represent the layer construction of the beta-alumina crystal, and the direction parallel to the lines is the C-plane direction, while the direction perpendicular to these lines is the C-axis direction.

When the shafts 1a, 1b and 1c are rotated to the positions shown in FIG. 5A wherein their C-planes are perpendicular to the plane of the separator 20, the greatest total area of the C-plane edges is exposed to electrode active material on each side of the separator, so that molten sodium and molten sulfur are in contact with C-plane portions of the shaft. Since the C-plane direction yields the highest conductivity of sodium ions, the greatest number of sodium ions will pass through the shaft in the direction of the C-plane of its crystal in a given time and react with the molten sulfur in the other chamber. Thus, the maximum energy produced by the reaction of the sodium and sulfur aappears as electrical energy on the electrodes 5, 5' and may be removed therefrom through the lead-in wires 6, 6'. The main body of the separator 20 being formed of alpha-alumina cannot act as an alkali metal ion current conductor, and thus, only the beta-alumina shafts control the energy flow in the cell.

When the shafts 1a, 1b and 1c are turned 90° by movement of rack 13, the C-planes of the shafts are aligned with the separator 20 as shown in FIG. 5C, and very little, or no portion of the C-plane edges are exposed to the electrode active materials in the two chambers. In this condition, the sodium ions have to reach the opposite side of the shaft by passing in the direction of the C-axis of the crystal of the shaft. The conductivity of the shaft in the C-axis direction is smallest, so that the amount of electricity capable of being taken from the electrodes 5, 5' is also smallest.

When the shafts 1a, 1b and 1c are turned to a 45° angle from that shown in FIG. 5A, i.e., to the positions shown in FIG. 5B, the C-planes of the crystal shafts are disposed between the positions described above and illustrated in FIG. 5A and the positions illustrated in 5C. In this condition, sodium ions must pass through the shafts partly in the direction of the C-planes and partly in the direction of the C-axes to react with the molten sulfur. Accordingly, the amount of electric current capable of being taken from the cell is smaller than that capable of being taken when the shafts are in their FIG. 5A condition and larger than that which can be taken when the shafts are in their 5C positions.

From the above it will be readily understood that the separator 20 including the crystal shafts 1a, 1b and 1c performs the dual function of acting as a membrane in the sodium-sulfur cell between the two electrode active materials and as an adjustable controller for the amount of electrical energy produced in the cell.

A separator similar to that described above may be installed between two electrodes in a sodium hydroxide electrolyzer for producing sodium. In this case, the rotatable beta-alumina crystal shaft, or shafts may be used to control the electric current of the electrolyzer by controlling the sodium ion current passing through the beta-aalumina crystal of the shaft.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A separator for control of alkali metal ions in an electrolytic cell, comprising a partition made of an alkali resistant and electrical insulating material adapted to separate liquid electrode active materials in a vessel, an opening formed in said partition and extending from side to side thereof, and a rotatable member made of beta-alumina crystal having conductive anisotropy journaled in said opening, the axis of said rotatable member being perpendicular to the C-axis of said beta alumina crystal, whereby the flow of alkali metal ions from one side of the partition to the other through said rotatable member can be controlled by turning said member to change its conductivity.

2. A separator according to claim 1, wherein said partition is formed of alpha-alumina.

3. A separator as claimed in claim 2, wherein said opening formed in the partition extends through the top to close to the bottom thereof and is exposed through its sidewalls, said rotatable member being a shaft journaled in said opening.

4. A separator according to claim 3, wherein said shaft is formed of a single crystal of beta-alumina and has an axis lying within the C-plane of said single crystal.

5. A separator according to claim 3, wherein said shaft extends above the partition and means for turning the shaft is secured to the top thereof.

6. a separator according to claim 3, in which said shaft is formed of small beta-alumina crystals adhered to one another with glass and more than 50% of said small beta-alumina crystals are disposed within 20° of the solid angle of the C-axis direction thereof.

7. A separator according to claim 6, wherein said beta-alumina crystals are formed as plates chipped from a single crystal in the C-plane, and said plates are adhered to each other with glass.

8. A separator according to claim 3, wherein is additionally provided a seal member surrounding said shaft and seated in said journal opening, said seal member being formed of a tube of rubber-like material and having diametrically opposed vertical slots therein substantially aligned with the sidewalls of said partition.

9. A separator according to claim 8, wherein said seal member is formed of a plastic.

10. The separator according to claim 1, in which said rotatable member is formed of sodium beta-alumina crystal.

11. A separator according to claim 1, wherein said rotatable member is formed of potassium beta-alumina crystal.

12. A separator according to claim 1, in combination with an electrolytic cell, said cell comprising a vessel divided into two chambers by said separator, each of said chambers having an electrode and an electrode active material therein, one of said electrode active materials being molten sodium and the other of said electrode active materials being molten sulphur.

13. In an electrolyzer for producing sodium comprising a vessel, a separator provided within said vessel and dividing said vessel into two chambers, two electrodes provided in said chambers, said two chambers constituting means for containing two electrolytes where one of said electrolytes contains sodium, the improvement wherein said separator comprises a partition made of an alkali resistant and electrical insulating material adapted to separate said electrolytes in said vessel, an opening formed in said partition and extending from side to side thereof, and a rotatable member made of beta-alumina crystal having conductive anisotropy and journaled in said opening, the axis of said rotatable member being perpendicular to the C-axis of said beta-alumina crystal, whereby the flow of sodium ions from one side of said partition to the other through said rotatable member can be controlled by turning said member to change its conductivity.

References Cited

UNITED STATES PATENTS

| | | | |
|---|---|---|---|
| 3,421,863 | 1/1969 | Bawa et al. | 136—143 |
| 3,535,163 | 10/1970 | Dzieciuch et al. | 136—153 |

DONALD L. WALTON, Primary Examiner

U.S. Cl. X.R.

136—145; 204—243 R, 295